United States Patent Office 2,880,103
Patented Mar. 31, 1959

2,880,103

COMPOSITIONS OF MATTER

Edward C. Soule, deceased, late of Niagara Falls, N.Y., by Eleanore Benner Soule, executrix, Niagara Falls, N.Y., and Leo S. Burnett, Niagara Falls, N.Y., assignors to Olin Mathieson Chemical Corporation, a corporation of Virginia No Drawing. Original application July 14, 1954, Serial No. 443,438, now Patent No. 2,832,744, dated April 29, 1958. Divided and this application February 5, 1958, Serial No. 713,780

4 Claims. (Cl. 106—122)

Our invention relates to novel blowing agents for the production of cellular plastic materials. More particularly, our invention relates to novel blowing agents comprising activated hydrazine mononitrate. Our invention also relates to compositions containing the new blowing agents, e.g., synthetic plastic compositions having the novel blowing agents incorporated therein.

The recent art on blowing agents for the production of cellular plastic materials is well illustrated by Kulp et al. in their U.S. Patent 2,621,161 which discloses the use of hydrazine, its salts and derivatives as blowing agents for rubber and plastics. Kulp et al. teach that the organic acid salts of hydrazine are particularly effective as blowing agents in rubber compositions. The organic acid salts of hydrazine are preferred by Kulp et al. to inorganic salts as blowing agents. The former are more effective but are relatively expensive materials as compared to the inorganic acid salts of hydrazine. Kulp et al. specifically investigated the sulfates, hydrochlorides and phosphates of hydrazine. These materials were very poor blowing agents. Neither the inorganic nor the organic acid salts of hydrazine compete with commercially useful blowing agents in spite of their ease of preparation and low cost.

We have now discovered a method for activating an inorganic acid salt of hydrazine which makes the inexpensive salt commercially competitive with the organic acid salts of hydrazine. Our novel blowing agents and compositions comprise hydrazine mononitrate and an activator such as a ferrous sulfate or molybdenum trioxide. The preferred activators are ferrous sulfate, ferrous ammonium sulfate, and molybdenum trioxide. We have found that hydrazine mononitrate when activated with the above materials is an effective blowing agent although hydrazine mononitrate itself is relatively ineffective in producing satisfactory products. Hydrazine dinitrate is dangerously explosive when heated and is therefore unsuitable for use as a blowing agent.

Our novel blowing agents and compositions containing them are suitable for blowing plastic materials. Thus our new blowing agents fill the need recognized by Kulp et al. whose blowing agents were suitable for use with rubber compositions but unsatisfactory for use with synthetic plastics.

Synthetic plastic materials which can be blown with our new agents include resins having a visco-elastic stage (in a plasticized or unplasticized condition). Included are alkyd resins, urea-formaldehyde resins, polymerized unsaturated substances, for example, polyacrylonitrile, polystyrene, polyvinyl resins, for example polyvinyl chloride and copolymers of vinyl chloride and vinyl acetate, amorphous non-resinous plastic substances such as cellulose esters, including cellulose acetate, cellulose ethers including ethyl cellulose and the like. The above materials can be either thermoplastic or thermosetting or can be substances which polymerize during the blowing operation. Plastisols are blown especially effectively by our agents. These materials are pastes formed by mixing particles of unplasticized resin with a plasticizer which is a nonsolvent for the resin particles at ordinary temperatures. When plastisols are heated to temperatures in the range commonly employed in blowing operations, the plasticizer dissolves the resin particles and forms a gel which solidifies on cooling.

We have found that from about 5 to 20 weight percent of our activated hydrazine mononitrate blowing agent gives satisfactory results with most plastic compositions. The amounts of activating agent which we have found to be generally effective range from about 1 to 15 weight percent of the hydrazine mononitrate.

Hydrazine mononitrate and the activator can be separately incorporated into the plastic composition immediately prior to carrying out the blowing operation, or the hydrazine mononitrate and activating salt can be admixed to form a stable blowing agent and added in that form to the composition to be blown. Another method of employing our novel activated hydrazine mononitrate blowing agents consists of incorporating the agent or its components into the plastic composition and storing the composition containing the blowing agent until used. Any of the above methods of using our new blowing agents produce satisfactory results but in any case it is advantageous that the hydrazine mononitrate and activator should be in finely divided condition when incorporated into the plastic composition.

The temperatures employed in blowing operations using our novel blowing agents are not highly critical but must, of course, be sufficiently high to decompose the blowing agent to generate blowing gas. Temperatures in the range of about 300 to 400° F. are usually sufficient but the temperature required varies slightly with the material to be blown.

Our invention will be further illustrated by the following examples.

*Example I*

A master batch of plastisol was prepared by grinding the following components in a mortar:

| Component: | Parts by weight |
|---|---|
| Polyvinyl chloride (Geon 121) | 100 |
| Dioctyl phthalate | 35 |
| Tricresyl phosphate | 65 |
| Stabilizer (Tribase E) | 4 |

To 50 parts by weight of the plastisol was added a pulverized and pre-mixed composition of 4.5 parts by weight of hydrazine mononitrate and 0.23 part by weight of $FeSO_4 \cdot 7H_2O$. The composition was poured into a mold and heated at 350 to 360° F. for ten to fifteen minutes under 30,000 p.s.i.g. pressure. After cooling below 150° F. under pressure, the sample was expanded freely for one hour in an oven at 100 to 105° C. The resulting product had a fine cellular structure and a light tan color. It had a volume of 5.8 times that of a blank from which the hydrazine mononitrate and activator were omitted. A blank containing hydrazine mononitrate without an activator gave an expanded disc having a volume of 1.6 times that of the blank containing neither hydrazine mononitrate nor activator.

The polyvinyl chloride, "Geon 121," employed in the above formulation is a product of the B. F. Goodrich Chemical Company. The stabilizer, "Tribase E" employed in the above formulation is a product of the National Lead Company and is a white basic lead salt of the composition $3PbO \cdot PbSO_4 \cdot H_2O$.

*Example II*

The procedure of Example I was repeated using 4.5 parts by weight of hydrazine mononitrate and 0.50 part by weight of $Fe(NH_4)_2(SO_4)_2 \cdot 6H_2O$ to 50 parts by weight of plastisol. Using the same procedure, the expanded disc had a volume of 3.6 times that of the blank and showed a fine cellular structure having a grayish-tan color.

*Example III*

The procedure of Example I was repeated using 4.5 parts by weight of hydrazine mononitrate and 0.1 part by weight of $FeSO_4 \cdot 7H_2O$ per 50 parts by weight of plastisol. Using the same procedure, the expanded disc had a volume of 4.2 times that of the blank, a fine cellular structure and a light gray color.

*Example IV*

The procedure of Example I was repeated using 2% of $MoO_3$, based on the hydrazine mononitrate, as activator. The expanded disc had a volume of 6.4 times that of the blank, a good cellular structure and a light gray color.

Thus, our invention makes possible the use of a relatively inexpensive salt of hydrazine as a blowing agent for synthetic plastic compositions. Our activated hydrazine mononitrate blowing agents have been found to be as effective as organic derivatives of hydrazine commercially used as blowing agents and far more effective than the organic acid salts of hydrazine. Due to their low cost, they are advantageously used in place of the more expensive materials.

This application is a division of our application Serial No. 443,438, filed July 14, 1954, now U.S. Patent 2,832,744.

We claim:

1. A process for the production of cellular compositions from synthetic plastic materials having a visco-elastic stage which comprises incorporating into said synthetic plastic materials from 5 to 20 percent by weight of a blowing agent comprising hydrazine mononitrate and from 1 to 15 percent by weight based on the hydrazine mononitrate of an activator selected from the group consisting of ferrous sulfate, ferrous ammonium sulfate, and molybdenum trioxide, and heating said synthetic plastic materials while in the visco-elastic state to a temperature sufficient to decompose the blowing agent and to blow said synthetic plastic material to produce a cellular composition.

2. A composition comprising a synthetic plastic material having a visco-elastic stage and a blowing agent comprising hydrazine mononitrate and from 1 to 15 percent by weight based on the hydrazine mononitrate of an activator selected from the group consisting of ferrous sulfate, ferrous ammonium sulfate and molybdenum trioxide, the blowing agent being in an amount sufficient to provide blowing of the synthetic plastic material to produce a cellular composition.

3. The process of claim 1 in which the temperature is about 300 to 400° F.

4. The composition of claim 2 in which the blowing agent is present in an amount of about 5 to 20 weight percent.

References Cited in the file of this patent
UNITED STATES PATENTS
2,621,161    Kulp et al. _____ Dec. 9, 1952